United States Patent
Klostermann et al.

(10) Patent No.: US 11,932,747 B2
(45) Date of Patent: Mar. 19, 2024

(54) USE OF LONG-CHAIN CITRIC ACID ESTERS IN AQUEOUS POLYURETHANE DISPERSIONS

(71) Applicant: Evonik Operations GmbH, Essen (DE)

(72) Inventors: Michael Klostermann, Essen (DE); Kai-Oliver Feldmann, Essen (DE); Jan Marian von Hof, Bochum (DE); Marvin Jansen, Essen (DE); Sina Arnold, Bottrop (DE)

(73) Assignee: Evonik Operations GmbH, Essen (DE)

( * ) Notice: Subject to any disclaimer, the term of this patent is extended or adjusted under 35 U.S.C. 154(b) by 218 days.

(21) Appl. No.: 17/331,452

(22) Filed: May 26, 2021

(65) Prior Publication Data
US 2021/0403676 A1 Dec. 30, 2021

(30) Foreign Application Priority Data
Jun. 24, 2020 (EP) .................................... 20181880

(51) Int. Cl.
| | | |
|---|---|---|
| C08J 9/30 | (2006.01) | |
| C08K 5/092 | (2006.01) | |
| C09K 23/34 | (2022.01) | |
| C09K 23/38 | (2022.01) | |

(52) U.S. Cl.
CPC ................ C08K 5/092 (2013.01); C08J 9/30 (2013.01); C09K 23/34 (2022.01); C09K 23/38 (2022.01); *C08J 2201/036* (2013.01); *C08J 2375/04* (2013.01)

(58) Field of Classification Search
CPC ... C07C 67/08; C07C 69/704; C08G 18/0866; C08J 9/30; C08J 2201/02; C08J 2201/036; C08J 2201/0504; C08J 2375/04; C08K 5/092; C08K 5/101; C08K 5/11; C08L 75/04; C09D 5/02; C09D 7/63; C09D 175/04; C09K 23/00; D06N 3/0043; D06N 3/0095; D06N 3/14; D06N 2211/28
See application file for complete search history.

(56) References Cited

U.S. PATENT DOCUMENTS

| | | | |
|---|---|---|---|
| 4,184,989 A | 1/1980 | Disteldorf et al. | |
| 4,772,665 A | 9/1988 | Disteldorf et al. | |
| 9,427,385 B2 | 8/2016 | Meyer et al. | |
| 9,776,951 B2 | 10/2017 | Friedrich et al. | |
| 10,292,925 B2 | 5/2019 | Gu et al. | |
| 10,995,174 B2 | 5/2021 | Emmrich-Smolczyk et al. | |
| 2006/0079635 A1 | 4/2006 | Pohl et al. | |
| 2011/0015279 A1 | 1/2011 | Doerr et al. | |
| 2014/0295724 A1 | 10/2014 | Sworen et al. | |
| 2015/0080352 A1* | 3/2015 | Viala .................. | C08G 18/4238 514/159 |
| 2015/0190318 A1* | 7/2015 | Gu ........................... | A61Q 1/14 510/513 |
| 2015/0284902 A1 | 10/2015 | Bhattacharjee et al. | |
| 2018/0327563 A1 | 11/2018 | Klostermann et al. | |
| 2019/0037838 A1 | 2/2019 | Klostermann et al. | |
| 2019/0202771 A1 | 7/2019 | Von Hof et al. | |
| 2019/0300728 A1 | 10/2019 | Klostermann et al. | |
| 2020/0039822 A1 | 2/2020 | Melenkevitz et al. | |
| 2020/0155436 A1 | 5/2020 | Hartung et al. | |
| 2020/0207938 A1 | 7/2020 | Klostermann et al. | |
| 2021/0047474 A1 | 2/2021 | Klostermann et al. | |
| 2021/0214488 A1 | 7/2021 | Emmrich-Smolczyk et al. | |
| 2021/0403493 A1 | 12/2021 | Klostermann et al. | |

FOREIGN PATENT DOCUMENTS

| | | |
|---|---|---|
| CN | 101120047 | 2/2008 |
| CN | 108495887 | 9/2018 |
| DE | 2538484 A1 | 3/1977 |
| EP | 3487945 A1 | 5/2019 |
| WO | 2008/068073 A1 | 6/2008 |
| WO | 2018/015260 A1 | 1/2018 |
| WO | 2019/042696 A1 | 3/2019 |
| WO | 2020/148170 A1 | 7/2020 |
| WO | 2021/003658 A1 | 1/2021 |
| WO | 2021/003659 A1 | 1/2021 |
| WO | 2021/007838 A1 | 1/2021 |
| WO | 2021/007839 A1 | 1/2021 |

OTHER PUBLICATIONS

Klostermann et al., U.S. Appl. No. 17/321,609, filed May 17, 2021.
Klostermann et al., U.S. Appl. No. 17/331,429, filed May 26, 2021.
Klostermann et al., U.S. Appl. No. 17/333,559, filed May 28, 2021.
Ferenz et al., U.S. Appl. No. 17/523,059, filed Nov. 10, 2021.
Modro et al., U.S. Appl. No. 17/367,456, filed Jul. 5, 2021.
Klostermann et al., U.S. Appl. No. 17/612,663, filed Nov. 19, 2021.
Klostermann et al., U.S. Appl. No. 17/612,690, filed Nov. 19, 2021.
Klostermann et al., U.S. Appl. No. 17/617,020, filed Dec. 7, 2021.
Klostermann et al., U.S. Appl. No. 17/617,127, filed Dec. 7, 2021.
European Search Report dated Dec. 8, 2020 in EP 20181880.4 (9 pages).
U.S. Office Action dated Sep. 13, 2023, in U.S. Appl. No. 17/321,609, 16 pages.

* cited by examiner

*Primary Examiner* — John M Cooney

(74) *Attorney, Agent, or Firm* — Grüneberg and Myers PLLC

(57) ABSTRACT

The use of long-chain citric acid esters as additives in aqueous polymer dispersions for production of porous polymer coatings, preferably for production of porous polyurethane coatings, is described.

15 Claims, No Drawings

USE OF LONG-CHAIN CITRIC ACID ESTERS IN AQUEOUS POLYURETHANE DISPERSIONS

CROSS REFERENCE TO RELATED APPLICATIONS

This application is a 35 U.S.C. § 119 patent application which claims the benefit of European Application No. 20181880.4 filed Jun. 24, 2020, which is incorporated herein by reference in its entirety.

FIELD

The present invention is in the field of plastics coatings and imitation leathers.

It relates more particularly to the production of porous polymer coatings, especially porous polyurethane coatings, using long-chain citric acid esters as additives.

BACKGROUND

Textiles coated with plastics, for example imitation leathers, generally consist of a textile carrier onto which is laminated a porous polymer layer which has in turn been coated with a top layer or a topcoat.

The porous polymer layer in this context preferably has pores in the micrometre range and is air-permeable and hence breathable, i.e. permeable to water vapor, but water-resistant. The porous polymer layer often comprises porous polyurethane. For environmentally friendly production of PU-based imitation leather, a method based on aqueous polyurethane dispersions, called PUDs, has recently been developed. These generally consist of polyurethane microparticles dispersed in water; the solids content is usually in the range of 30-60% by weight. For production of a porous polyurethane layer, these PUDs are mechanically foamed, coated onto a carrier (layer thicknesses typically between 300-2000 μm) and then dried at elevated temperature. During this drying step, the water present in the PUD system evaporates, which results in formation of a film of the polyurethane particles. In order to further increase the mechanical strength of the film, it is additionally possible to add hydrophilic (poly)isocyanates to the PUD system during the production process, and these can react with free OH radicals present on the surface of the polyurethane particles during the drying step, thus leading to additional crosslinking of the polyurethane film.

Both the mechanical and the tactile properties of PUD coatings thus produced are determined to a crucial degree by the cell structure of the porous polyurethane film. In addition, the cell structure of the porous polyurethane film affects the air permeability and breathability of the material. Particularly good properties can be achieved here with very fine, homogeneously distributed cells. A customary way of influencing the cell structure during the above-described production process is to add foam stabilizers to the PUD system before or during the mechanical foaming. A first effect of appropriate stabilizers is that sufficient amounts of air can be beaten into the PUD system during the foaming operation. Secondly, the foam stabilizers have a direct effect on the morphology of the air bubbles produced. The stability of the air bubbles is also influenced to a crucial degree by the type of stabilizer. This is important especially during the drying of foamed PUD coatings, since it is possible in this way to prevent drying defects such as cell coarsening or drying cracks.

Various foam stabilizers have already been used in the past in the above-described PUD process. Document US 2015/0284902 A1 or US 2006 0079635 A1, for example, describes the use of ammonium stearate-based foam stabilizers. However, the use of corresponding ammonium stearate-based stabilizers is associated with a number of drawbacks. A significant drawback here is that ammonium stearate has a very high migration capacity in the finished imitation leather. The effect of this is that surfactant molecules accumulate at the surface of the imitation leather with time, which can result in white discoloration at the leather surface. Furthermore, this surfactant migration can result in a greasy film that is perceived as unpleasant on the surface of the imitation leather, especially when corresponding materials come into contact with water.

A further disadvantage of ammonium stearate is that it forms insoluble lime soaps on contact with hard water. In the case of contact of imitation leather produced on the basis of ammonium stearate with hard water, white efflorescence can thus arise at the imitation leather surface, which is undesirable especially in the case of dark-colored leather.

Yet another drawback of ammonium stearate-based foam stabilizers is that they do permit efficient foaming of aqueous polyurethane dispersions, but often lead to quite a coarse and irregular foam structure. This can have an adverse effect on the optical and tactile properties of the finished imitation leather.

Yet another drawback of ammonium stearate is that the PUD foams produced often have inadequate stability, which can lead to drawbacks in the processing thereof, especially in the drying of the PUD foams at elevated temperatures. A consequence of this is, for example, that corresponding foams have to be dried relatively gently and slowly, which in turn leads to longer process times in imitation leather production.

As an alternative to ammonium stearate-based foam stabilizers, polyol esters and polyol ethers were identified in the past as effective foam additives for aqueous polyurethane dispersions. These structures are described, for example, in documents EP 3487945 A1 and WO2019042696A1. Compared to ammonium stearate, polyol esters and polyol ethers have the major advantage that they migrate only slightly, if at all, in the finished imitation leather and hence do not lead to unwanted surface discoloration. Moreover, polyol esters and polyol ethers are not sensitive to hard water.

A further advantage of polyol esters and polyol ethers over ammonium stearate-based foam stabilizers is additionally that they often lead to a distinctly finer and more homogeneous foam structure, which has advantageous effects on the properties of imitation leather materials produced with these substances. Polyol esters and polyol ethers often also lead to much more stable PUD foams, which in turn brings process-related advantages in imitation leather production.

In spite of these advantages, polyol esters and polyol ethers are also not entirely free of potential drawbacks. A potential drawback is that the foam-stabilizing effect of these compound classes can be impaired under some circumstances by the presence of further cosurfactants present in the PUD system. Especially in the production of aqueous polyurethane dispersions, however, the use of cosurfactants is not unusual. Cosurfactants are used in this context for improved dispersion of polyurethane prepolymers in water and generally remain in the final product. During the mechanical foaming of aqueous polyurethane dispersions containing polyol esters or polyol ethers as foam additives, corresponding cosurfactants can have adverse effects on the foaming characteristics of the system under some circumstances. As a result, in some cases, it is possible for only little air, if any at all, to be beaten into the system; the resultant foam structure would then be comparatively coarse and the leather quality is reduced. Cosurfactants can also have an adverse effect on the stability of the foams produced, which can result in foam ageing during the processing of the foamed PUD system, which in turn leads to faults and defects in the foam coatings produced.

Another potential drawback is that PUD systems containing polyol esters or polyol ethers as foam additives often require very high shear energies for efficient foaming. This in turn can entail limitations and process-related drawbacks under some circumstances and limits the selection of machinery utilized industrially for foam generation.

SUMMARY

The problem addressed by the present invention was therefore that of providing additives for production of PUD-based foam systems and foam coatings that enable efficient foaming of PUD systems and do not have the drawbacks detailed in the art. It has been found that, surprisingly, long-chain citric acid esters enable the solution of the stated problem.

DETAILED DESCRIPTION

The present invention therefore provides for the use of long-chain citric acid esters as additives, preferably as foam additives, in aqueous polymer dispersions, preferably aqueous polyurethane dispersions, for production of porous polymer coatings, preferably for production of porous polyurethane coatings.

The inventive use of long-chain citric acid esters surprisingly has various advantages here.

One advantage is that long-chain citric acid esters enable particularly efficient foaming of aqueous PUD systems. The foams thus produced are notable here for an exceptionally fine pore structure with particularly homogeneous cell distribution, which in turn has a very advantageous effect on the mechanical and tactile properties of the porous polymer coatings which are produced on the basis of these foams. In addition, it is possible in this way to improve the air permeability or breathability of the coating.

A further advantage is that long-chain citric acid esters, even at relatively low shear rates, enable efficient foaming of PUD systems, which leads to fewer limitations and broader processibility during imitation leather production.

Yet another advantage is that long-chain citric acid esters enable the production of particularly stable foams. This firstly has an advantageous effect on the processibility thereof, especially by virtue of additional time flexibility in the production processes. Secondly, the elevated foam stability has the advantage that, during the drying of corresponding foams, drying defects such as cell coarsening or drying cracks can be avoided. Furthermore, the improved foam stability enables quicker drying of the foams, which offers processing advantages both from an environmental and from an economic point of view.

Yet another advantage is that the efficacy of long-chain citric acid esters is barely impaired, if at all, by cosurfactants present in the PUD system. Thus, the surfactant formulations according to the invention, even in the case of cosurfactant-containing PUD systems, enable efficient foaming of the system, and the formation of fine and homogeneous foams that are simultaneously extremely stable.

Yet another advantage is that the long-chain citric acid esters according to the invention, in the finished imitation leather, have barely any migration capacity, if any, and thus do not lead to unwanted surface discoloration or efflorescence. Furthermore, the surfactants according to the invention are barely sensitive to hard water, if at all.

The term "long-chain citric acid esters" throughout the present invention encompasses esters of citric acid ($C_6H_8O_7$) and long-chain alkyl and alkenyl alcohols. What is meant by "long-chain" in this context is that the alcohols have at least 12, preferably at least 14, carbon atoms, more preferably at least 16 carbon atoms. Preference is given here both to branched and linear hydrocarbyl radicals.

The term "cosurfactant" throughout the present invention encompasses additional surfactants that may be present in the polymer dispersion alongside the long-chain citric acid esters according to the invention. These especially include surfactants that are used during the production of the polymer dispersion. For example, polyurethane dispersions are often produced by synthesis of a PU prepolymer which, in a second step, is dispersed in water and then reacted with a chain extender. For improved dispersion of the prepolymer in water, it is possible here to use cosurfactants. In the context of the present invention, the cosurfactants are preferably anionic cosurfactants.

The invention is described further and by way of example hereinafter, without any intention that the invention be restricted to these illustrative embodiments. Where ranges, general formulae or compound classes are specified below, these are intended to include not only the corresponding ranges or groups of compounds which are explicitly mentioned but also all subranges and subgroups of compounds which can be obtained by removing individual values (ranges) or compounds. Where documents are cited in the context of the present description, the entire content thereof, particularly with regard to the subject matter that forms the context in which the document has been cited, is intended to form part of the disclosure content of the present invention. Unless otherwise stated, percentages are in percent by weight. Where parameters that have been determined by measurement are given hereinbelow, the measurements have been carried out at a temperature of 25° C. and a pressure of 101 325 Pa, unless otherwise stated. Where chemical (empirical) formulae are used in the present invention, the specified indices can be not only absolute numbers but also average values. For polymeric compounds, the indices preferably represent average values. Structural and empirical formulae presented in the present invention are representative of all isomers that are possible by differing arrangement of the repeating units.

In the context of the present invention, preference is given especially to those long-chain citric acid esters that are obtainable by reacting long-chain alcohols with citric acid with elimination of water. These reactions may if required employ suitable catalysts, for example organic or inorganic acids such as for example p-toluenesulfonic acid, sulfuric acid or methanesulfonic acid, acidic salts, carbonyl chlorides, metals or amphoteric metal oxides, metal alkoxides or carboxylates such as for example tetrabutyl (ortho)titanate or tin(II) 2-ethylhexanoate. Corresponding reactions are known to the person skilled in the art and are described, for example, in *Römpp—Chemie Lexikon* (Thieme-Verlag, 1996).

In the context of the present invention, it is further preferable when the long-chain citric acid esters according to the invention have an average degree of esterification of 1-2.7, preferably of 1.3-2.6, more preferably of 1.4-2.5, even more preferably of 1.5-2.4. The degree of esterification is defined here as the molar ratio of alcohol to citric acid. Average degree of esterification means the arithmetic average.

It is possible that the above-described reactions for preparation of the long-chain citric acid esters according to the invention do not proceed to completion, and hence residues of unconverted alcohols and/or citric acid may also be present in the reaction mixture. The term "citric acid esters" in the context of the present invention therefore also encompasses those esters containing free alcohols and/or free citric acid.

Furthermore, it is possible in the above-described reactions for preparation of the long-chain citric acid esters according to the invention that mixtures of different esters, consisting of mono-, di- and/or triesters, may form during the reaction, and these may further contain free citric acid and/or free fatty alcohol. The term "citric acid esters" in the context of the present invention therefore also encompasses such mixtures.

In addition, it is possible in the above-described reactions for preparation of the long-chain citric acid esters according to the invention that linear, branched or cyclic, oligomeric or polymeric condensation products of citric acid may form during the reaction. The term "citric acid esters" in the context of the present invention therefore also encompasses those esters containing linear, branched or cyclic, oligomeric or polymeric condensation products of citric acid and esters of these compounds. In the context of the overall present invention, the term "oligomeric" designates molecules containing 2 or more repeating units.

The alcohols used for preparation of the long-chain citric acid esters described are preferably lauryl alcohol (1-dodecanol), myristyl alcohol (1-tetradecanol), cetyl alcohol (1-hexadecanol), margaryl alcohol (1-heptadecanol), stearyl alcohol (1-octadecanol), arachidyl alcohol (1-eicosanol), behenyl alcohol (1-docosanol), lignoceryl alcohol (1-tetracosanol), ceryl alcohol (1-hexacosanol), montanyl alcohol (1-octacosanol), melissyl alcohol (1-triacontanol), palmitoleyl alcohol (cis-9-hexadecen-1-ol), oleyl alcohol (cis-9-octadecen-1-ol) and/or elaidyl alcohol (trans-9-octadecen-1-ol) and in each case structural isomers having the same total formulae and mixtures of these substances, particular preference being given to cetyl alcohol and stearyl alcohol and to mixtures of these two substances.

Sources of the above-described long-chain alcohols may be vegetable or animal fats, oils or waxes. For example, it is possible to use: pork lard, beef tallow, goose fat, duck fat, chicken fat, horse fat, whale oil, fish oil, palm oil, olive oil, avocado oil, seed kernel oils, coconut oil, palm kernel oil, cocoa butter, cottonseed oil, pumpkinseed oil, maize kernel oil, sunflower oil, wheatgerm oil, grapeseed oil, sesame oil, linseed oil, soybean oil, peanut oil, lupin oil, rapeseed oil, mustard oil, castor oil, jatropha oil, walnut oil, jojoba oil, lecithin, for example based on soya, rapeseed or sunflowers, bone oil, neatsfoot oil, borage oil, lanolin, emu oil, deer tallow, marmot oil, mink oil, safflower oil, hemp oil, pumpkin oil, evening primrose oil, tall oil, and also carnauba wax, beeswax, candelilla wax, ouricury wax, sugarcane wax, retamo wax, caranday wax, raffia wax, esparto wax, alfalfa wax, bamboo wax, hemp wax, Douglas fir wax, cork wax, sisal wax, flax wax, cotton wax, dammar wax, tea wax, coffee wax, rice wax, *oleander* wax, beeswax and/or wool wax.

It is further preferable when the citric acid esters according to the invention are prepared using branched long-chain, primary or secondary alcohols. Preference is given here especially to Guerbet alcohols, i.e. branched alcohols formed by Guerbet condensation, and to branched secondary alcohols formed by paraffin oxidation by the Bashkirov method.

It is further preferable in the context of the present invention when the long-chain citric acid esters according to the invention are prepared using alkoxylated, preferably ethoxylated/propoxylated, derivatives of the alcohols described in detail above. In this case, it is preferable when each alcohol radical bears not more than 10, preferably not more than 7, more preferably not more than 5, even more preferably not more than 3, alkoxy units.

It is especially preferable in the context of the present invention when the citric acid esters according to the invention are monopalmityl citrate, dipalmityl citrate, monostearyl citrate, distearyl citrate, and mixtures of these substances, dipalmityl citrate and/or distearyl citrate and/or monostearyl-monopalmityl citrate and a mixture of these substances are especially preferred.

In the context of the present invention, preference is given especially to those citric acid esters that conform to the general formula (I)

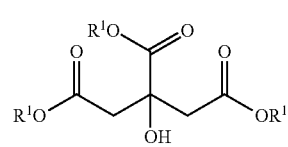

Formula (I)

where the R' radicals are independently identical or different monovalent aliphatic or aromatic, saturated or unsaturated hydrocarbyl radicals having 12 to 40 carbon atoms, preferably 14 to 30, more preferably having 16 to 24 carbon atoms, or H, with the proviso that a statistical numerical average of at least 0.3, preferably 0.4, more preferably 0.5, even more preferably 0.6, of all R' radicals is H. Formula (I) thus also describes mixtures of various mono-, di- and triesters of citric acid and long-chain alcohols. Such mixtures are likewise preferred in accordance with the invention. Statistical numerical average means the arithmetic average.

As already described, during the above-described reactions for preparation of the long-chain citric acid esters according to the invention, linear, branched or cyclic, oligomeric or polymeric condensation products of citric acid may also form. It is therefore possible that the long-chain citric acid esters, as well as those conforming to the general formula (I), additionally contain those conforming to the general formula (II). This is likewise preferred in the context of the present invention.

$$M_wD_xT_yQ_z$$ Formula (II)

where

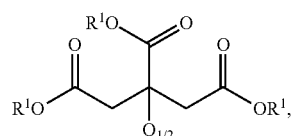

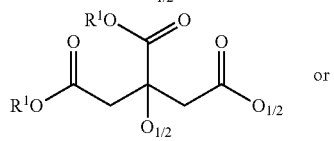 or

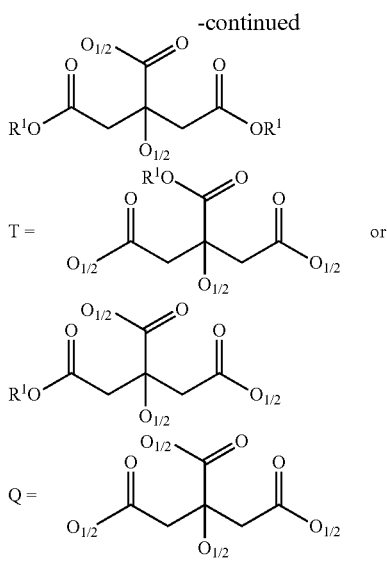

W=0 to 11, preferably 0 to 5, especially preferably 0 to 2,
x=0 to 10, preferably 0 to 5, especially preferably 0 to 2,
y=0 to 5, preferably 0 to 5, especially preferably 0 to 2,
z=0 to 3, preferably 0 to 2, especially preferably 0 to 2,
and $R^1$ is as defined above, with the proviso that a statistical numerical average of at least 10%, preferably at least 15%, more preferably at least 20%, of all $R^1$ radicals are H.

With regard to the general formula (II), it should be noted that the structural units M, D, T and Q are joined here via oxygen bridges in each case. Two formal $O_{1/2}$ radicals are always joined here to form an oxygen bridge (—O—), where any $O_{1/2}$ radical may be joined only to one further $O_{1/2}$ radical.

In structural terms, the citric acid esters according to the invention can be characterized via wet-chemical indices, for example their hydroxyl number, their acid number and their hydrolysis number. Suitable determination methods for determining the hydroxyl number are especially those according to DGF C-V 17 a (53), Ph. Eur. 2.5.3 Method A and DIN 53240. Suitable methods for determining the acid number are especially those according to DGF C-V 2, DIN EN ISO 2114, Ph.Eur. 2.5.1, ISO 3682 and ASTM D 974. Suitable determination methods for determining the hydrolysis number are particularly those according to DGF C-V 3, DIN EN ISO 3681 and Ph.Eur. 2.5.6. In the context of the present invention, preference is given here to those citric acid esters that have an acid number of 35-150 mg KOH/g, preferably of 40-140 mg KOH/g, more preferably of 45-125 mg KOH/g.

The present invention encompasses both the use of neutralized and non-neutralized long-chain citric acid esters as additives in aqueous polymer dispersions, particular preference being given to the use of neutralized long-chain citric acid esters. The term "neutralization" over the entire scope of the present invention also covers partial neutralization. For neutralization, including partial neutralization, it is possible to use customary bases. These include the water-soluble metal hydroxides, for example barium hydroxide, strontium hydroxide, calcium hydroxide and preferably the hydroxides of the alkali metals that dissociate into free metal and hydroxide ions in aqueous solutions, especially NaOH and KOH. These also include the anhydro bases which react with water to form hydroxide ions, for example barium oxide, strontium oxide, calcium oxide, lithium oxide, silver oxide and ammonia. As well as these aforementioned alkalis, solid substances usable as bases are also those which likewise give an alkaline reaction on dissolution in water without having HO— (in the pure compound); examples of these include amines such as mono-, di- and trialkylamines, which may also be functionalized alkyl radicals as, for example, in the case of amide amines, mono-, di- and trialkanolamines or mono-, di- and triaminoalkylamines, and, for example, the salts of weak acids, such as potassium carbonate, sodium carbonate, trisodium phosphate, etc. In addition, it is also possible to use higher-functionality amines, for example ethylenediamine, diethylenetriamine or triethylenetetramine, for neutralization.

As already mentioned, the present invention envisages the use of long-chain citric acid esters as described in detail above as additives in aqueous polymer dispersions, preferably in aqueous polyurethane dispersions. The polymer dispersions here are preferably selected from the group of aqueous polystyrene dispersions, polybutadiene dispersions, poly(meth)acrylate dispersions, polyvinyl ester dispersions and/or polyurethane dispersions. The solids content of these dispersions is preferably in the range of 20-70% by weight, more preferably in the range of 25-65% by weight. Particular preference is given in accordance with the invention to the use of long-chain citric acid esters as additives in aqueous polyurethane dispersions. Especially preferable here are polyurethane dispersions based on polyester polyols, polyesteramide polyols, polycarbonate polyols, polyacetal polyols and/or polyether polyols.

In the context of the present invention, it is preferable when the concentration of the long-chain citric acid esters, based on the total weight of the aqueous polymer dispersion, is in the range of 0.1-20% by weight, more preferably in the range of 0.2-15% by weight, especially preferably in the range of 0.5-10% by weight.

Preference is given to using the long-chain citric acid esters in aqueous polymer dispersions as foaming aids or foam stabilizers for foaming of the dispersions, i.e. as foaming additives. In addition, however, they may also be used as drying auxiliaries, levelling additives, wetting agents and rheology additives, which likewise corresponds to preferred embodiments of the present invention.

As well as the long-chain citric acid esters according to the invention, the aqueous polymer dispersions may also comprise further additions/formulation components, for example color pigments, fillers, flatting agents, stabilizers such as hydrolysis or UV stabilizers, bactericides, antioxidants, absorbers, crosslinkers, levelling additives, thickeners and further cosurfactants.

The long-chain citric acid esters can be added to the aqueous dispersion either in pure or blended form in a suitable solvent. Preferred solvents in this connection are selected from water, propylene glycol, dipropylene glycol, polypropylene glycol, butyldiglycol, butyltriglycol, ethylene glycol, diethylene glycol, polyethylene glycol, polyalkylene glycols based on EO, PO, BO and/or SO, alcohol alkoxylates based on EO, PO, BO and/or SO, and mixtures of these substances, very particular preference being given to aqueous dilutions or blends. Blends or dilutions of long-chain citric acid esters preferably contain at least 5% by weight, more preferably 10% by weight, even more preferably 15% by weight, of the long-chain citric acid esters according to the invention.

In the case of aqueous dilutions or blends of the long-chain citric acid esters according to the invention, it may be advantageous when hydrotropic compounds are added to the blend to improve the formulation properties (viscosity, homogeneity, etc.). Hydrotropic compounds here are water-soluble organic compounds consisting of a hydrophilic part and a hydrophobic part, but are too low in molecular weight to have surfactant properties. They lead to an improvement in the solubility or in the solubility properties of organic, especially hydrophobic organic, substances in aqueous formulations. The term "hydrotropic compounds" is known to those skilled in the art. Preferred "hydrotropic compounds" in the context of the present invention are alkali metal and ammonium toluenesulfonates, alkali metal and ammonium xylenesulfonates, alkali metal and ammonium naphthalenesulfonates, alkali metal and ammonium cumenesulfonates, and phenol alkoxylates, especially phenol ethoxylates, having up to 6 alkoxylate units.

It may also be advantageous for the long-chain citric acid esters to be used not in pure form but in combination with further cosurfactants as additives in aqueous polymer dispersions, preferably in aqueous polyurethane dispersions. These may be used, for example, for improved system compatibility or, in the case of pre-formulated surfactant mixtures, for improved formulation properties. Cosurfactants preferred in accordance with the invention in this context are, for example, free fatty alcohols, fatty acid amides, ethylene oxide-propylene oxide block copolymers, betaines, for example amidopropyl betaines, amine oxides, quaternary ammonium surfactant, amphoacetates, ammonium and/or alkali metal salts of fatty acids, alkyl sulfates, alkyl ether sulfates, alkylsulfonates, alkylbenzenesulfonates, alkyl phosphates, alkyl sulfosuccinates, alkyl sulfosuccinamates, alkyl sarcosinates and mixtures of these substances, very particular preference being given to free fatty alcohols, preferably having 12 to 40, more preferably having 14-30, even more preferably having 16-24, carbon atoms, and alkyl sulfates having 12 to 40, more preferably having 14-30, even more preferably having 16-24, carbon atoms, and mixtures of these substances. In addition, the cosurfactant may comprise silicone-based surfactants, for example trisiloxane surfactants or polyether siloxanes. In the case of ammonium and/or alkali metal salts of fatty acids, it is preferable when they contain less than 25% by weight of stearate salts, and are especially free of stearate salts.

In the case of combinations of the long-chain citric acid esters according to the invention with further cosurfactants, as described above, it is especially preferred when these combinations include between 1% and 60% by weight, preferably between 2% and 50% by weight, more preferably between 3% and 40% by weight, even more preferably between 5% and 30% by weight, of cosurfactant, based on the combination of long-chain citric acid esters according to the invention and cosurfactant.

Since, as described above, the inventive use of long-chain citric acid esters leads to a distinct improvement in porous polymer coatings produced from aqueous polymer dispersions, the present invention likewise provides aqueous polymer dispersions comprising at least one of the long-chain citric acid esters according to the invention, as described in detail above.

The present invention still further provides porous polymer layers which have been produced from aqueous polymer dispersions, obtained with the inventive use of long-chain citric acid esters, as described in detail above.

Preferably, the porous polymer coatings according to the invention can be produced by a process comprising the steps of a) providing a mixture comprising at least one aqueous polymer dispersion, at least one long-chain citric acid ester according to the invention, and optionally further formulation components,
b) foaming the mixture to give a foam,
c) optionally adding at least one thickener to adjust the viscosity of the wet foam,
d) applying a coating of the foamed polymer dispersion to a suitable carrier,
e) drying/curing the coating.

The porous polymer coatings have pores preferably in the micrometre range, preferably with an average cell size of less than 350 µm, more preferably less than 200 µm, especially preferably less than 150 µm, very especially preferably less than 100 µm. The average cell size can be determined preferably by microscope, preferably by electron microscopy. For this purpose, a cross section of the porous polymer coating is viewed by means of a microscope with a sufficient magnification and the size of at least 25 cells is determined. The average cell size then results as the arithmetic average of the cells or cell sizes viewed.

With a view to preferred configurations, especially with a view to the long-chain citric acid esters and polymer dispersions that are usable with preference in the process, reference is made to the preceding description and also to the aforementioned preferred embodiments, especially as detailed in the claims.

It is made clear that the process steps of the process according to the invention as set out above are not subject to any fixed sequence in time. For example, process step c) can be executed at an early stage, at the same time as process step a).

It is a preferred embodiment of the present invention when, in process step b), the aqueous polymer dispersion is foamed by the application of high shear forces. The foaming can be effected here with the aid of shear units familiar to the person skilled in the art, for example Dispermats, dissolvers, Hansa mixers or Oakes mixers.

In addition, it is preferable when the wet foam produced at the end of process step c) has a viscosity of at least 5, preferably of at least 10, more preferably of at least 15 and even more preferably of at least 20 Pa·s, but of not more than 500 Pa·s, preferably of not more than 300 Pa·s, more preferably of not more than 200 Pa·s and even more preferably of not more than 100 Pa·s. The viscosity of the foam can be determined here, for example, with the aid of a Brookfield viscometer, LVTD model, equipped with an LV-4 spindle. Corresponding test methods for determination of the wet foam viscosity are known to those skilled in the art.

In a preferred embodiment of the present invention, in process step b), the foam has maximum homogeneity and cell fineness. The person skilled in the art is able to verify this on the basis of their typical experience, if desired, in a customary manner by simple direct visual inspection by the naked eye or with optical aids, for example magnifying glasses or microscopes. "Cell fineness" relates to cell size. The smaller the average cell size, the finer the foam cells. If desired, the fine cell content can be determined, for example, with a light microscope or with a scanning electron microscope. "Homogeneous" means cell size distribution. A homogeneous foam has a very narrow cell size distribution, such that all cells are roughly the same size. This could be quantified in turn with a light microscope or with a scanning electron microscope.

As already described above, additional thickeners can be added to the system to adjust the wet foam viscosity. The thickeners are preferably selected here from the class of the associative thickeners. Associative thickeners are substances which lead to a thickening effect through association at the surfaces of the particles present in the polymer dispersions. The term is known to those skilled in the art. Preferred associative thickeners are selected here from polyurethane thickeners, hydrophobically modified polyacrylate thickeners, hydrophobically modified polyether thickeners and hydrophobically modified cellulose ethers. Very particular preference is given to polyurethane thickeners. In addition, it is preferable in the context of the present invention when the concentration of the thickeners based on the overall composition of the dispersion is in the range of 0.01-10% by weight, more preferably in the range of 0.05-5% by weight, most preferably in the range of 0.1-3% by weight.

In the context of the present invention, it is additionally preferable when, in process step d), coatings of the foamed polymer dispersion with a layer thickness of 10-10 000 µm, preferably of 50-5000 µm, more preferably of 75-3000 µm, even more preferably of 100-2500 µm, are produced. Coatings of the foamed polymer dispersion can be produced by methods familiar to the person skilled in the art, for example knife coating. It is possible here to use either direct or indirect coating processes (called transfer coating).

It is also preferable in the context of the present invention when, in process step e), the drying of the foamed and coated polymer dispersion is effected at elevated temperatures. Preference is given here in accordance with the invention to drying temperatures of min. 50° C., preferably of 60° C., more preferably of at least 70° C. In addition, it is possible to dry the foamed and coated polymer dispersions in multiple stages at different temperatures, in order to avoid the occurrence of drying defects. Corresponding drying techniques taking account of temperature, ventilation and relative humidity of the atmosphere are widespread in industry and known to the person skilled in the art.

As already described, process steps c)-e) can be effected with the aid of widely practised methods known to those skilled in the art. An overview of these is given, for example, in "Coated and laminated Textiles" (Walter Fung, CR-Press, 2002).

In the context of the present invention, preference is given especially to those porous polymer coatings comprising long-chain citric acid esters and having an average cell size less than 350 µm, preferably less than 200 µm, especially preferably less than 150 µm, most preferably less than 100 µm. The average cell size can preferably be determined by microscopy, preferably by electron microscopy. For this purpose, a cross section of the porous polymer coating is viewed by means of a microscope with sufficient magnification and the size of at least 25 cells is ascertained. In order to obtain sufficient statistics for this evaluation method, the magnification of the microscope chosen should preferably be such that at least 10×10 cells are present in the observation field. The average cell size is then calculated as the arithmetic average of the cells or cell sizes viewed. This determination of cell size by means of microscopy is familiar to those skilled in the art.

The porous polymer layers (or polymer coatings) according to the invention, comprising at least one of the long-chain citric acid esters according to the invention and optionally further additives, may be used, for example, in the textile industry, for example for imitation leather materials, in the building and construction industry, in the electronics industry, in the sports industry or in the automobile industry. For instance, on the basis of the porous polymer coatings according to the invention, it is possible to produce everyday articles such as shoes, insoles, bags, suitcases, small cases, clothing, automobile parts, preferably seat covers, coverings of door parts, dashboard parts, steering wheels and/or handles, and gearshift gaiters, fitout articles such as desk pads, cushions or seating furniture, gap fillers in electronic devices, cushioning and damping materials in medical applications, or adhesive tapes.

EXAMPLES

Substances:

SYNTEGRA® YS:3000: MDI (methyl diphenyl diisocyanate)-based polyurethane dispersion from DOW. As a result of the process for preparing it, the product contains 1-3% by weight of the anionic cosurfactant sodium dodecylbenzenesulfonate (CAS: 25155-30-0).

IMPRANIL® DLU: aliphatic polycarbonate esterpolyether-polyurethane dispersion from Covestro.

REGEL® WX 151: aqueous polyurethane dispersion from Cromogenia

CROMELASTIC® PC 287 PRG: aqueous polyurethane dispersion from Cromogenia

STOKAL® STA: ammonium stearate (about 30% in $H_2O$) from Bozetto

STOKAL® SR: tallow fat-based sodium sulfosuccinamate (about 35% in $H_2O$) from Bozetto Sodium dodecylbenzenesulfonate (LAS; CAS: 25155-30-0) was sourced from Sigma Aldrich.

This is a standard cosurfactant used for production of aqueous polyurethane dispersions.

ECO Pigment Black: aqueous pigment dispersion (black) from Cromogenia.

TEGOWET® 250: polyethersiloxane-based levelling additive from Evonik

ORTEGOL® PV 301: polyurethane-based associative thickener from Evonik Industries AG.

REGEL® TH 27: isocyanate-based levelling additive from Cromogenia

Viscosity Measurements:

All viscosity measurements were conducted with a Brookfield viscometer, LVTD, equipped with an LV-4 spindle, at a constant rotation speed of 12 rpm. For the viscosity measurements, the samples were transferred into a 100 ml jar into which the measurement spindle was immersed to a stipulated depth. The display of a constant viscometer measurement was always awaited.

Example 1: Synthesis of Stearyl Citrate Having a Degree of Esterification of 2.1

Stearyl alcohol (>95%, 275.2 g, 1.02 mol, 2.1 eq.) was heated to 70° C. with stirring and N2 introduction before citric acid (anhydrous, 93.10 g, 0.485 mol, 1.0 eq.) was added. The reaction mixture was heated to 140° C. and at a pressure of 150 mbar stirred for 3 h with N2 introduction until an acid number of 62 mg KOH/g was achieved. The mixture was filtered at 2 bar using a pressure filter press (1 µm) at a temperature of 120° C. After cooling, a colorless solid having an acid number of 57 mg KOH/g was obtained.

Example 2: Synthesis of Stearyl Citrate Having a Degree of Esterification of 2.4

Stearyl alcohol (>95%, 244.0 g, 0.902 mol, 2.4 eq.) was heated to 70° C. with stirring and N2 introduction before citric acid (anhydrous, 72.23 g, 0.376 mol, 1.0 eq.) was added. The reaction mixture was heated to 140° C. and at a pressure of 150 mbar stirred for 4 h with N2 introduction until an acid number of 50 mg KOH/g was achieved. The mixture was filtered at 2 bar using a pressure filter press (1 μm) at a temperature of 130° C. After cooling, a colorless solid having an acid number of 48 mg KOH/g was obtained.

Example 3: Synthesis of Behenyl Citrate Having a Degree of Esterification of 2.1

Behenyl alcohol (70-80%, 245.7 g, 0.763 mol, 2.1 eq.) was heated to 80° C. with stirring and N2 introduction before citric acid (anhydrous, 69.78 g, 0.363 mol, 1.0 eq.) was added. The reaction mixture was heated to 140° C. and at a pressure of 150 mbar stirred for 2 h with N2 introduction until an acid number of 63 mg KOH/g was achieved. The mixture was filtered at 2 bar using a pressure filter press (1 μm) at a temperature of 120° C. After cooling, a colorless solid having an acid number of 61 mg KOH/g was obtained.

Example 4: Comparative Example

As well as the citric acid esters according to the invention, a comparative surfactant based on polyglycerol-3 stearate was also used, which was prepared by reacting 103.3 g of polyglycerol—OHN=1124 mg KOH/g, Mw=240 g/mol—with 155.0 g of technical grade stearic acid.

Example 5: Surfactant Blends

The citric acid esters from Examples 1-3 and the polyglycerol ester-based comparative surfactant were blended with the according to the compositions detailed in Table 1 and then homogenized at 80° C. Inventive surfactant formulations 1-3 were then neutralized to pH=7 with KOH. Comparative surfactant 4 already had a pH of 7 after blending and was not neutralized.

TABLE 1

Composition of surfactant blends used hereinafter

| | Surfactant 1 | Surfactant 2 | Surfactant 3 | Surfactant 4 |
|---|---|---|---|---|
| Stearyl citrate - 2.1 eq (from Example 1) | 20.0 g | — | | |
| Stearyl citrate - 2.4 eq (from Example 2) | | 20.0 g | | |
| Behenyl citrate with 2.4 eq (from Example 3) | | | 20.0 g | |
| Polyglycerol-3 stearate (comparative example) | | | | 20.0 g |
| Stearyl alcohol | 4.0 g | 4.0 g | 4.0 g | 4.0 g |
| Water | 76.0 g | 76.0 g | 76.0 g | 76.0 g |

Example 6: Foaming Tests

To test the efficacy of the additive combination according to the invention, a series of foaming experiments was conducted. For this purpose, in a first step, the IMPRANIL® DLU polyurethane dispersion from Covestro was used. The foam stabilizers used were the inventive surfactant formulations 1-3 (see table 1) and a combination of the two surfactants Stokal STA (ammonium stearate) and Stokal SR (sodium sulfosuccinamate) as comparison. Table 2 gives an overview of the compositions of the respective experiments.

All foaming experiments were conducted manually. For this purpose, polyurethane dispersion and surfactant were first placed in a 500 ml plastic cup and homogenized with a dissolver equipped with a dispersing disc (diameter=6 cm) at 1000 rpm for 3 min. For foaming of the mixtures, the shear rate was then increased to 2000 rpm, ensuring that the dissolver disc was always immersed into the dispersion to a sufficient degree that a proper vortex formed. At this speed, the mixtures were foamed to a volume of about 425 ml. The mixture was then sheared at 1000 rpm for a further 15 minutes. In this step, the dissolver disc was immersed sufficiently deeply into the mixtures that no further air was introduced into the system, but the complete volume was still in motion.

TABLE 2

Overview of foam formulations

| | #1 | #2 | #3 | #4 |
|---|---|---|---|---|
| IMPRANIL ® DLU | 150 g | 150 g | 150 g | 150 g |
| Surfactant 1 | 4 g | — | — | — |
| Surfactant 2 | — | 4 g | — | — |
| Surfactant 3 | — | — | 4 g | — |
| Stokal STA | — | — | — | 2 g |
| Stokal SR | — | — | — | 2 g |
| Wet foam viscosity [mPa s] | 7.2 | 6.9 | 7.1 | 4.0 |

In all cases, fine homogeneous foams were obtained at the end of this foaming operation. It was noticeable that the foams which had been produced with inventive surfactants 1-3 had a higher viscosity (see Table 2). The foams were coated onto a siliconized polyester film with the aid of a film applicator (AB3220 from TQC) equipped with an applicator frame (coat thickness=800 μm) and then dried at 60° C. for 5 min and at 120° C. for a further 5 min.

Compared to sample #4, the dried inventive samples #1-#3 featured a more homogeneous macroscopic appearance and a more velvety feel. In electron microscopy studies, moreover, it was possible to ascertain a finer pore structure.

Example 7: Migration Tests

To assess the surface migration of the surfactants according to the invention, imitation leather materials were produced by the method that follows. First of all, a topcoat coating was applied to a siliconized polyester film (layer thickness 100 μm). This was then dried at 100° C. for 3 minutes. Subsequently, a foam layer was coated onto the dried topcoat layer (layer thickness 800 μm) and dried at 60° C. for 5 minutes and at 120° C. for 5 minutes. In a last step, an aqueous adhesive layer (layer thickness 100 μm) was coated onto the dried foam layer, and then a textile carrier was laminated onto the still-moist adhesive layer. The finished laminate was dried again at 120° C. for 5 minutes and then detached from the polyester film.

All coating and drying operations were performed here with a Labcoater LTE-S from Mathis AG. Topcoat and adhesive layer were formulated here in accordance with the compositions listed in Table 3; the foam layers used were the foam formulations listed in Table 2, which were foamed by the method described in Example 6.

TABLE 3

Topcoat and adhesive formulation for production of imitation leather materials

|  | Topcoat | Adhesive |
|---|---|---|
| CROMELASTIC ® PC 287 PRG | 100 g | — |
| REGEL ® WX 151 | — | 100 g |
| ECO Pigment Black | 10 g | 5 g |
| TEGOWET ® 250 | 0.2 g | 0.2 g |
| REGEL ® TH 27 | 6 g | 6 g |
| ORTEGOL ® PV 301 | 7 g | 5 g |

For assessment of surfactant migration, the imitation leather samples, after production, were placed into water at 100° C. for 30 minutes and then dried at room temperature overnight. After this treatment, the comparative sample produced with the Stokal STA/SR surfactants (foam formulation #4, Table 2) had distinctly visible white spots on the surface of the imitation leather, whereas this surface discoloration was not observed in the case of the samples produced with the surfactants according to the invention (foam formulation #1-#3, Table 2).

Example 8: Cosurfactant Compatibility

For assessment of cosurfactant compatibility, further foaming tests were conducted with the SYNTEGRA® YS:3000 PUD system. This contains 1-3% by weight of the anionic cosurfactant sodium dodecylbenzenesulfonate (CAS: 25155-30-0). The surfactants used in these experiments were the surfactant formulations 1-4 listed in Table 1. Table 4 gives an overview of the composition of the foam formulations.

TABLE 4

Overview of foam formulations:

|  | #5 | #6 | #7 | #8 |
|---|---|---|---|---|
| SYNTEGRA ® YS 3000 | 150 g | 150 g | 150 g | 150 g |
| Surfactant 1 | 4 g | — | — | — |
| Surfactant 2 | — | 4 g | — | — |
| Surfactant 3 | — | — | 4 g | — |
| Surfactant 4 | — | — | — | 4 g |

On the basis of these formulations, foam coatings were produced by the method described in Example 6. It was noticeable here that sample #8 produced with comparative surfactant 4 had a much coarser and less homogeneous foam structure. After the foam coating had dried, it was also possible to observe clear cracks in the foam structure, which is a pointer to inadequate stabilization of the foam. Samples #5-#7 produced with the inventive surfactants, by contrast, again showed an extremely fine-cell and homogeneous foam structure. They were also free of drying cracks.

In addition, a further series of foaming experiments was conducted, in which the actually cosurfactant-free IMPRANIL® DLU system was deliberately additized with sodium dodecylbenzenesulfonate, a common cosurfactant for PUD stabilization as already described. In these experiments too, the surfactants used were the surfactant formulations 1-4 listed in Table 1. Table 5 gives an overview of the composition of the foam formulations.

TABLE 5

Overview of foam formulations:

|  | #9 | #10 | #11 | #12 |
|---|---|---|---|---|
| IMPRANIL ® DLU | 150 g | 150 g | 150 g | 150 g |
| Sodium dodecylbenzenesulfonate | 1.5 g | 1.5 g | 1.5 g | 1.5 g |
| Surfactant 1 | 4 g | — | — | — |
| Surfactant 2 | — | 4 g | — | — |
| Surfactant 3 | — | — | 4 g | — |
| Surfactant 4 | — | — | — | 4 g |

Here too, foam coatings were produced by the method described in Example 6. It was again noticeable here that sample #12 produced with comparative surfactant 4 had drying cracks and a much coarser cell structure, whereas the inventive samples #9-#11 again showed a fine and homogeneous cell structure and were free of defects. Virtually no difference from the analogous, cosurfactant-free samples #1-#3 (see Example 6) was observable here. These experiments thus demonstrate the distinct improvement in cosurfactant compatibility of the surfactants according to the invention.

The invention claimed is:

1. An aqueous polymer dispersion, comprising:
   a foam additive comprising a long-chain citric acid ester, wherein the long-chain citric acid ester is obtained by condensing a long-chain alcohol with citric acid, wherein the long-chain alcohol has at least 12 carbon atoms, and
   wherein the long-chain citric acid ester has an average degree of esterification of 1-2.7, wherein the degree of esterification is defined as an employed molar ratio of alcohol to citric acid.

2. The aqueous polymer dispersion according to claim 1, wherein the alcohol used is selected from the group consisting of lauryl alcohol (1-dodecanol), myristyl alcohol (1-tetradecanol), cetyl alcohol (1-hexadecanol), margaryl alcohol (1-heptadecanol), stearyl alcohol (1-octadecanol), arachidyl alcohol (1-eicosanol), behenyl alcohol (1-docosanol), lignoceryl alcohol (1-tetracosanol), ceryl alcohol (1-hexacosanol), montanyl alcohol (1-octacosanol), melissyl alcohol (1-triacontanol), palmitoleyl alcohol (cis-9-hexadecen-1-ol), oleyl alcohol (cis-9-octadecen-1-ol) and/or elaidyl alcohol (trans-9-octadecen-1-ol) and/or respective structural isomers of the same empirical formulae, and mixtures of these substances, and/or branched long-chain primary and/or secondary alcohols.

3. The aqueous polymer dispersion according to claim 1, wherein the long-chain citric acid ester according to the invention conforms to the general formula (I):

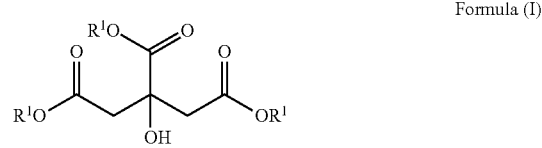

Formula (I)

where the $R^1$ radicals are independently identical or different monovalent aliphatic or aromatic, saturated or unsaturated hydrocarbyl radicals having 12 to 40 carbon atoms, or H, wherein a statistical numerical average of at least 0.3 of all $R^1$ radicals is H.

4. The aqueous polymer dispersion according to claim 1, wherein the long-chain citric acid ester additionally contains free, unreacted alcohols, and free citric acid.

5. The aqueous polymer dispersion according to claim 1, wherein the long-chain citric acid ester additionally contains linear, branched or cyclic, oligomeric or polymeric condensation products of citric acid and esterified derivatives thereof.

6. The aqueous polymer dispersion according to claim 1, wherein the long-chain citric acid ester is neutralized, which also includes partial neutralization, neutralization being accomplished using water-soluble metal hydroxides.

7. The aqueous polymer dispersion according to claim 1, further comprising:
   at least one further cosurfactant selected from the group consisting of fatty alcohols, fatty acid amides, ethylene oxide-propylene oxide block copolymers, betaines, amine oxides, quaternary ammonium surfactant, amphoacetates, ammonium and/or alkali metal salts of fatty acid, alkyl sulfates, alkyl ether sulfates, alkylsulfonates, alkylbenzenesulfonates, alkyl phosphates, alkyl sulfosuccinates, alkyl sulfosuccinamates, alkyl sarcosinates or else silicone-based cosurfactants, and mixtures of these substances.

8. The aqueous polymer dispersion according to claim 1, wherein the aqueous polymer dispersion is selected from the group consisting of aqueous polystyrene dispersions, polybutadiene dispersions, poly(meth)acrylate dispersions, polyvinyl ester dispersions, and polyurethane dispersions.

9. The aqueous polymer dispersion according to claim 1, wherein the concentration of the long-chain citric acid ester based on the total weight of the aqueous polymer dispersion is in the range of 0.1-20% by weight.

10. A process for producing a porous polymer coating the process comprising:
   a) foaming at least one aqueous polymer dispersion according to claim 1 to give a wet foam, wherein said aqueous dispersion optionally comprises a further additive, foam,
   b) optionally adding at least one thickener to adjust the viscosity of the wet foam,
   c) applying a coating of the wet foam to a suitable carrier, and
   d) drying the coating.

11. An aqueous polyurethane, comprising the aqueous polymer dispersion of claim 1.

12. The aqueous polymer dispersion according to claim 1, wherein the long-chain citric acid ester has an average degree of esterification of 1.5-2.2, wherein the degree of esterification is defined as the molar ratio of alcohol to citric acid.

13. The aqueous polymer dispersion according to claim 3, where the $R^1$ radicals are independently identical or different monovalent aliphatic or aromatic, saturated or unsaturated hydrocarbyl radicals having 16 to 24 carbon atoms, or H, wherein a statistical numerical average of 0.8 of all $R^1$ radicals is H.

14. The aqueous polymer dispersion according to claim 1, wherein the concentration of the long-chain citric acid esters based on the total weight of the aqueous polymer dispersion is in the range of 0.5-10% by weight.

15. The aqueous polymer dispersion according to claim 1, wherein the long-chain alcohol is stearyl alcohol, cetyl alcohol, or a mixture thereof.

\* \* \* \* \*